United States Patent Office 3,075,887
Patented Jan. 29, 1963

3,075,887
DRYING OF BACTERIAL CULTURES
John H. Silliker, Park Forest, Carl H. Koonz, Downers Grove, and Clarence E. Jansen, Palos Heights, Ill., assignors to Swift & Company, Chicago, Ill., a corporation of Illinois
No Drawing. Filed Oct. 3, 1960, Ser. No. 59,829
7 Claims. (Cl. 195—101)

The present invention relates to the production of improved microbiological cultures, and more particularly to the production of dried viable bacterial cultures that are easily maintained at relatively constant biological potentials for long periods of time.

Recently, the food processing industry has commenced wide scale use of food flavor development techniques, which involve the incorporation of living microorganisms, i.e., bacteria, into a variety of food products. Since the adaptation of such bacteria induced flavor development processes, there has been a substantial demand created for preserved bacterial cultures that are easy to maintain, simple to use, available in quantity, and above all, low in cost.

The prior art describes several techniques that have been used to reduce microbiological cultures to a state of dormant preservation. Among the better known techniques that have been developed to prepare dormant microbiological cultures are lyophilization, oil sealing, deep freezing, and absorption-desiccation.

To date, the first mentioned lyophilization technique has probably experienced the widest successful application, particularly in cases where relatively small amounts of microorganisms are to be preserved for extended periods of time. Lyophilization, however, due to its high cost and complexity, is not generally considered a suitable method for preparing the large quantities of bacteria culture that are required by the food processing industry for its flavor development operations.

Of the other above mentioned preserving techniques, the ones which involve either the sealing of microbiological cultures with oil, or the absorption and drying of culture on solid absorbers such as silica gel, are not generally suited to the requirements of the food industry. This is due to the fact the sealing materials and/or absorbers often act as contaminants in the food being processed, and for this reason these extraneous materials must be removed from the culture before use.

The deep freeze technique, while not being objectionable from the direct cost or contaminant viewpoint, has inherent drawbacks in that the cultures prepared thereby must be transported and maintained at below freezing temperatures. Also, since the process usually involves the freezing of the entire liquid medium in which the organisms are grown, the indirect costs involved in shipping and storing the large volume of accompanying fluid is often considerable.

It is therefore an object of the present invention to provide an improved microbiological culture composition.

It is another object of this invention to provide a dried microbiological culture that will remain viable over long periods of time without special maintenance.

It is still another object of this invention to provide a dried bacteria culture that will remain at relatively constant biological potential for extended periods of time.

It is a further object of this invention to provide a bacteria culture that is readily incorporated into processed food products.

It is even a further object of this invention to provide a method for rapidly producing an improved viable microbiological culture.

It is still a further object of this invention to provide a method for converting viable microbiological culture suspensions into a dry particulate state, whereby a large portion of biable microorganisms are retained in the dried product.

It is yet a further object of this invention to provide a method for producing large quantities of dried bacterial cultures that are free of food contaminants.

These and still other objects will become readily apparent to one skilled in the art from the following detailed description of the invention.

In general, the novel microbiological compositions contemplated herein are prepared by utilization of a foam drying technique which involves; first converting a viable microbiological culture into a relatively stable foamaceous mass having a large volume relative to weight, then drying the foamaceous material to form a friable composition that is easily reduced to a particulate state.

More specifically, the foam dried cultures of the present invention are obtained by a process set forth in the following numerically listed steps: (1) An expandable, i.e., whippable, proteinaceous material is added to an aqueous culture medium or an aqueous suspension of a culture that contains a desired type of microorganism. (2) The culture medium containing the proteinaceous material is then subjected to a whipping operation, whereby a large quantity of gas is dispersed throughout the composition and a relatively stable foam is formed. (3) The foamaceous culture is then extruded onto a drying surface. (4) The extruded foam is next subjected to the drying action of a suitable drying medium. (5) The dried foam is finally collected, reduced to the desired particle size, and placed in suitable containers.

It has been found that by expanding the culture medium before drying, the material presents a much larger surface area to the drying medium than if left in the unexpanded state. This increased surface area makes possible a very rapid drying rate which results in a superior product as well as shorter and more economic drying operations.

The whippable proteinaceous material that is added to the culture medium may be derived from any one of several natural sources, both animal and vegetable. The specific choice of the protein source may well depend on the final use of the ultimate microbiological product. Where the culture is to be added to food product, the proteinaceous material must of course be edible, and should be compatible with the food product to which it is being added. For instance, when the prepared culture is being added to meat products, for flavor development therein, the proteinaceous material may well be gelatin as derived from animal sources. More specifically, where a bacteria culture is added to treat pork items, the source of the gelatin used to prepare the culture could be obtained from pork skins. If such a choice were made, the added gelatin would not be considered an adulterant to the final product. Other whippable proteinaceous materials that may be used, in addition to gelatin, include egg albumen, casein, soya protein, blood albumen, as well as any whippable protein fraction of cereals such as corn or wheat.

The proteinaceous material is added to the culture medium in amounts sufficient to convert the culture medium to a stable foam. A "stable foam" for purposes of the present disclosure, is one that will remain foamaceous for a sufficient time after formation to permit extrusion and drying without collapse. The generally preferred amounts of proteinaceous material utilized in the present composition, range from about 4.0% to about 5.0% based on the water content of the media solution, and may range as high as from 10.0% to as low as 2.0% if desired without substantially altering the quality of the final product. These concentrations of protein are given for a theoretically 100% pure protein source. Should the protein material used be something less than 100% protein, allowance should be made for the other constituents present.

As mentioned above, the proteinaceous material is added to an aqueous solution or suspension of the culture. Obviously, if the culture media used to grow the microorganisms contains a relatively large amount of water (usually over 90%) the protein may be added directly thereto. However, if the microorganisms are grown in media other than liquid, an aqueous extract of the culture will have to be made before the protein is added.

It should also be noted that a portion or all of the whippable protein may be added to the culture media, before or during the incubation period provided its presence does not interfere with the normal growth of the microorganism.

The protein material may conveniently be added directly to the aqueous media in a dry state, whereupon the media-protein composition should be set aside for a period sufficient to hydrolyze the protein before the whipping operation is begun. Alternatively, an aqueous solution containing hydrolyzed protein may be used, thereby obviating the need for a hydrolyzing period.

The expanding (whipping) of the protein containing culture may be carried out by any one of several conventional methods that will serve to incorporate large volumes of air into the product. The most well known type of whipping procedure involves the use of the common egg beater or "mix-master" or commercial equivalents thereof. Such apparatus is completely satisfactory so long as the shearing forces exerted by the blades thereof do not exert an excessively destructive force of the microorganisms contained in the culture.

Another suitable whipping procedure involves the direct passage of a gas under pressure through the protein solution, whereby the bubbling action of the gas would serve to produce foam. Still another suitable foam producing procedure comprises the entraining of a culture with a gas under pressure while being held in a closed vessel. The gas entrained composition is then slowly allowed to enter a zone of reduced pressure, whereupon the gas in the solution expands, thus creating a foam. Such a procedure, when carried out using inert gases is particularly suited to the formation of foams contining oxygen labile microorganisms.

After expanding the protein-culture solution, the resulting foam is spread in a thin layer (preferably ribbons) onto a drying surface. The purpose of forming a thin layer of the foam is to increase the drying area thereof and thus facilitate drying. The foam layer may be practically any thickness, however, the thinner ones will, of course, dry more rapidly. Generally, foam layers from about 1 inch to about 1½ inches in thickness are quite satisfactory.

The foam layer may be conveniently formed by extruding the foam through a suitable orifice, the size and shape of which, regulate the width and thickness of the foam ribbon. Alternatively, the foam layer may be formed using a spatula or doctor blade of appropriate configuration. The foam layer may be placed either as a solid sheet, or preferably, in ribbons, on any suitable supporting member such as a glass or stainless steel sheet.

The drying step of the present process is perhaps the most critical step of the instant invention. It is necessary that the drying temperatures used do not exceed the temperature at which the microorganisms being treated are destroyed, however, the temperature used should be as high as possible to effect sufficient vapor pressure in the water being removed to produce an economic drying rate as possible. Conceivably, the drying temperature used for very heat sensitive cultures could be below 32° F. at which the vapor pressure of water is less than about 5 mm. Hg; however, the drying rate would be rather slow. The preferred temperature used for a given organism is that temperature which is both low enough to give a satisfactory organism recovery and at the same time, give a reasonably fast drying rate.

For bacteria such as $Pediococcus\ cerevisiae$ air temperatures as high as about 140° F. and as low as 120° F. have been found to be particularly satisfactory. However, organisms such as $Lactobacillus\ bulgaricus$-$acidophilus$ will not survive air temperature exceeding 105–120° F. Other heat resistant organisms such as $Lactobacillus\ thermophilus$ will easily withstand air temperatures as high as 150° F.

The preferred drying procedure used involves placing the extruded foam culture in the path of a dried current of gas heated (or cooled) to the desired drying temperature. The kind of gas current used will depend on the organism being dried. For non-oxygen labile organisms heated air is usually a satisfactory drying agent. For organisms sensitive to oxygen inert gases or gases compatible to the particular organism being treated could conveniently be used in lieu of air.

The period of time required to achieve a satisfactory dried culture will vary in accordance to the water content of the culture, the thickness of the foam layer, as well as the temperature, dryness and velocity of the drying medium, i.e., gas. In general drying periods ranging from about 30 to about 90 minutes have been found satisfactory for drying cultures containing up to about 99% water at temperatures in the range of 120–150° F.

After the drying operation is completed the dried culture is generally in the form of flakes and granules which may easily be reduced to a powder if desired. The particulate product may then be sealed in sterile containers and stored at temperatures appropriate for the particular microorganism so processed until use.

The medium used to grow the cultures processed in the present invention may contain practically any of the known nutrients needed to produce the organism desired. Common ingredients for bacterial culture medium are meat and vegetable derivatives, including gelatin, sucrose, and glucose, inorganic salts, including buffer salts, such as phosphates, calcium carbonate, sodium chloride, etc., as well as intermediates such as yeast extract, and so forth. In general, most any culture and medium may be processed in accordance with the present invention, so long as the culture and the essential ingredients of its medium are capable of being suspended or dissolved in water.

It has also been found that the most successful bacteria recovery is achieved when the pH of the organism culture is adjusted to that value which is most conducive to preservation of the organisms before the drying step is commenced. The particular pH value used will, of course, depend on the organisms being processed and in general may vary from about 6.5 to about 7.5. The following specific examples, in which all parts or percentages are represented by weight unless otherwise specified, illustrate specific embodiments of the instant invention.

*Example I*

An aqueous medium containing the following ingredients was prepared—

| | Percent |
|---|---|
| Edible gelatin | 1.0 |
| $K_2HPO_4$ | 0.5 |
| $KH_2PO_4$ | 0.2 |
| Yeast extract | 0.3 |
| Sucrose | 0.2 |
| Glucose | 0.2 |
| Water | Balance |

A 1000 ml. sample of the above medium was sterilized by heat, then inoculated with $Pediococcus\ cerevisiae$. The culture was then incubated at 100° F. for a period of 24 hours during which the bacteria count reached $1.5 \times 10^{10}$ bacteria per gram of solids present in the culture. The pH of the culture was adjusted to about 6.5, and 5% edible gelatin was added. The culture which then contained 6% gelatin (based on protein content) was held for 45 minutes to allow complete hydrolyzation of the added protein. The protein-culture mixture was then whipped wtih an ordinary egg beater until a stable foam resulted. This foam was then placed in a pastry bag and extruded in the form of narrow strips onto a stainless steel sheet. The extruded foam was subjected to a 130° F. blast of air for 45 minutes at which time the culture appeared completely dry. The bacteria count of the dried culture was found to be $3.0 \times 10^9$ bacteria per gram of solids. This represents a 20.0% numerical recovery. The bacteria dried in this manner were sealed in glass ampules and stored at room temperature for a period of 30 days after which time the bacteria count was found to be $2.8 \times 10^9$ per gram of solids.

*Example II*

Another 1000 ml. sample of the medium described in Example I was sterilized, inoculated with *Leuconostoc dextranicum*, and incubated at 100° F. for a period of 24 hours during which the bacteria count reached $1.0 \times 10^{10}$ bacteria per gram of solids present in the culture. The pH of the culture was adjusted to about 6.5, and 6% edible gelatin was added. The culture was held for 1 hour to allow complete hydrolyzation of the added protein and was then whipped and dried as in Example I. The dried product was sealed in glass and stored for 30 days at room temperature after which the bacteria count was found to be $1.5 \times 10^9$ per gram of solids.

*Example III*

A 1000 ml. sample of the medium described in Example I was inoculated with *Leuconostoc citrovorum* and incubated at 100° F. for 24 hours after which the bacteria count was found to be $1.5 \times 10^{10}$ per gram of solids. The pH was adjusted to about 6.5 and 3.5% by weight of gelatin was added. The mixture was then expanded and dried as mentioned above, then sealed in glass. After 30 days the product was reconstituted by adding water and the bacteria count was found to be $3.0 \times 10^{10}$ per gram of dried solids.

*Example IV*

Another 1000 ml. sample of the medium used above was inoculated with *Lactobacillus bulgaricus* and incubated for 24 hours at 100° F. after which the bacteria count was found to be $2.0 \times 10^{10}$ per gram of solids. The pH of the mixture was adjusted to 6.5 and 8% by weight of edible gelatin was added. The mixture was expanded and dried in the manner defined in the previous examples. The dried material was sealed in glass and stored for 30 days after which time the bacteria count was found to be $1.7 \times 10^9$ per gram of solids.

The preceding specific examples clearly illustrate that cultures of microorganisms may be rapidly and conveniently reduced to a state of dormant preservation by the method disclosed herein.

The culture compositions obtained herein are in a form that may easily be converted to an active growing state merely by the addition of water and suitable nutrients, and therefore find use in any process that requires a ready source of viable microorganisms.

Obviously many modifications and variations of the invention as hereinbefore set forth may be made without departing from the spirit and scope thereof, and therefore only such limitations should be imposed as are indicated in the appended claims.

We claim:
1. A method for producing a dried viable bacteria culture which comprises: adding an expandable proteinaceous material to an aqueous medium containing a suspension of bacteria; expanding the protein containing bacteria medium by incorporating a gas therein to form a stable foam; and gas drying said foam with a dried current of gas at temperatures below which inactivation of said bacteria takes place.

2. A method for producing a dried viable bacteria culture which comprises: adding from about 2% to about 10% by weight of a whippable proteinaceous material to an aqueous suspension of bacteria; whipping the protein-bacteria solution to form a stable foam thereof; and subjecting the foamaceous material to a current of gaseous drying medium until said foamaceous material is substantially dry.

3. The method of claim 2 wherein the temperature of the gaseous drying medium is maintained at from about 32° F. to about 150° F.

4. A method for producing dried viable bacteria cultures which comprises: adding from about 2% to about 10% by weight of a whippable proteinaceous material to an aqueous suspension of bacteria; incorporating foam producing volumes of gas into said protein containing bacteria suspension to produce a stable foamaceous mass therefrom; extruding said foamaceous mass onto a drying surface in the form of a plurality of ribbons; subjecting the extruded material to a current of gaseous drying medium until said material is substantially dry, the temperatures of said drying medium being maintained at a temperature below which inactivation of said bacteria takes place; and reducing said dried foamaceous mass to a particulate state.

5. In a process for preserving bacteria cultures the steps comprising: preparing an aqueous suspension of bacteria; dissolving from about 2% to about 10% by weight of an expandable proteinaceous material in said aqueous suspension; expanding said proteinaceous material by incorporating large volumes of gas in said solution to form a stable foamaceous mass thereof; extruding said foamaceous mass upon a drying surface; subjecting said extruded foam to gaseous drying by a drying current of gas maintained at a temperature below that at which inactivation of said bacteria takes place for a period of time sufficient to substantially remove the moisture from said foam; reducing the dried foam to a particulate state; and storing the particulate material under preserving conditions.

6. The method of claim 1 wherein the expandable proteinaceous material is gelatin.

7. The method of claim 2 wherein the expandable proteinaceous material is egg albumen.

References Cited in the file of this patent
UNITED STATES PATENTS

| | | |
|---|---|---|
| 1,694,807 | Brown | Dec. 11, 1928 |
| 2,710,810 | Strashun | June 14, 1955 |
| 2,919,194 | Johnston | Dec. 29, 1959 |